March 2, 1926.

C. E. MANSIR

MOLDING MACHINE

Filed August 21, 1925

1,574,986

Inventor;
Clifford E. Mansir,
by
Att'ys.

Patented Mar. 2, 1926.

1,574,986

UNITED STATES PATENT OFFICE.

CLIFFORD E. MANSIR, OF CAMBRIDGE, MASSACHUSETTS, ASSIGNOR TO A. H. HEWS & CO., INCORPORATED, OF CAMBRIDGE, MASSACHUSETTS, A CORPORATION OF MASSACHUSETTS.

MOLDING MACHINE.

Application filed August 21, 1925. Serial No. 51,714.

*To all whom it may concern:*

Be it known that I, CLIFFORD E. MANSIR, a citizen of the United States, residing at Cambridge, in the county of Middlesex and State of Massachusetts, have invented new and useful Improvements in Molding Machines, of which the following is a specification.

This invention relates to machines for molding and forming articles of plastic or moldable material, such, for example, as earthen-ware flower pots and other articles of general cylindrical or frusto-conical shape.

Heretofore it has been the practice to place the plastic material in a mold of proper shape to form the outside of the article and then to introduce into the mold a plunger of proper shape to form the inside of the article, one of these instrumentalities being rotated whereby the plastic material is formed into the desired shape. The plunger has also been provided with a member fitting between the plunger and the upper edge of the mold for forming or shaping the top or upper end of the molded article. In the practical operation of the machine an excess quantity of material is put in, the excess being squeezed out between the top-forming member and the mold during the molding operation. This causes a fin or feather of material on the molded article which if not earlier removed must be chipped off after the article has been baked or otherwise set or hardened.

To remove the fin in the course of the molding operations, it has been proposed to attach knives and spring-supported wipers to a separate collar mounted on the plunger to move therewith and wipe off extrusions of excess material. It is the object of this invention to provide a wiping device which is simpler, and more economical and efficient than any suggested heretofore.

It has been found that soft or yielding materials such as rubber are far more resistant to wear by contact with abrasive materials than are the hardest metals. Accordingly an object of this invention is to provide that only parts made of rubber or other similar soft material can directly engage the molded material in removing the fin, so that replacements are therefore relatively infrequent and inexpensive. A further economy is effected by the fact that the rubber wipers may be small chunks or blocks of waste rubber which can be cut from old tire shoes or any other discarded or waste article of rubber which can be purchased very cheaply. It makes no difference whether or not other materials, such as fabric, happen to be incorporated with the rubber, as the wipers may be made of laminated rubber and fabric.

Each chunk of rubber may be clamped directly against the side of the top-forming member itself, thus making possible the application of the device to the usual molding machine in the simplest possible manner.

The elimination of blades or knives by the use of rubber wipers only removes a serious source of danger to the operator.

This invention has been found in practice to be highly efficient and economical. For a more complete understanding thereof, together with further features and advantageous details and combinations of parts, reference may be had to the accompanying drawing in which—

Figure 1:
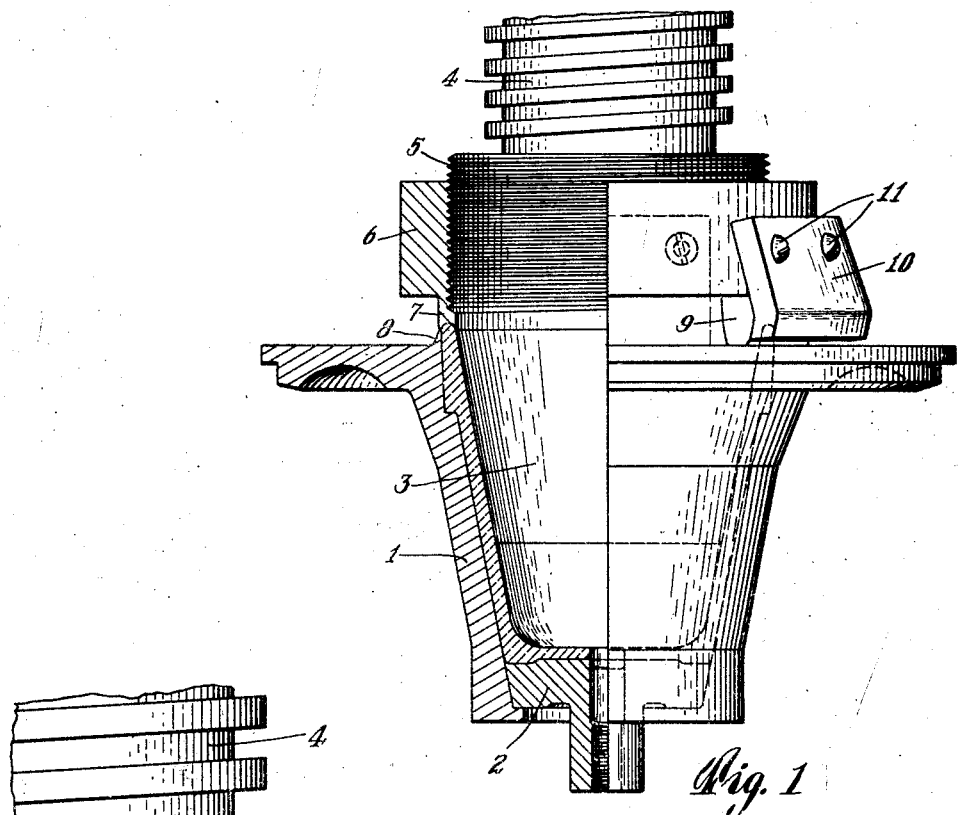
Figure 1 shows an elevation of shaping elements of the molding machine provided with wipers, a part of the mold being shown in section.
Figure 2:
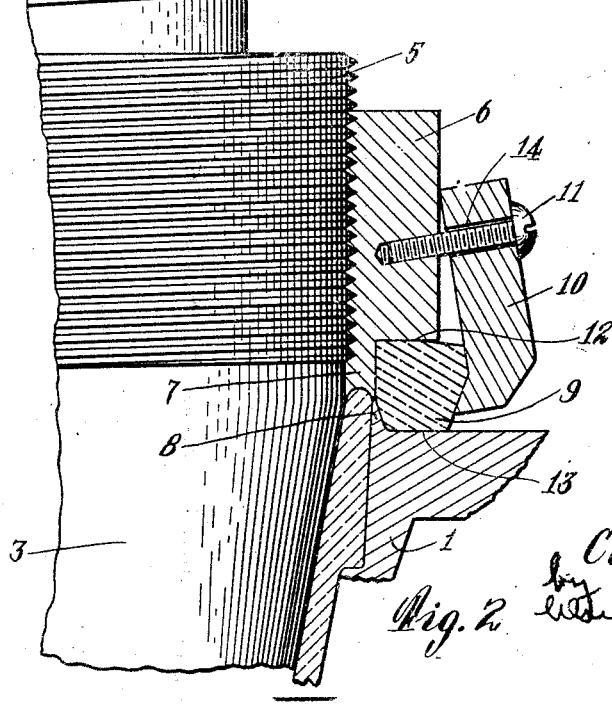
Figure 2 is a detail sectional view on a larger scale, showing the position of a wiper relative to the mold and top-forming member.

Referring in detail to the drawing, 1 indicates the mold which is suitably shaped to form a flower pot or other article made therein. Within the mold is seated a base member 2, which is movable to facilitate the removal of the molded article. A plunger 3 is shown in position within the mold. This plunger is formed on a shank 4 by which it is attached to a rotatable head not shown. This shaft is shown as having an enlarged threaded portion 5 on which is adjustably mounted a top-forming member 6. The lower lip 7 of this top-forming member is formed so as to give the proper shape to the top of the molded article. As the shaping parts come together, this lip 7 approaches an upstanding bevelled lip 8 on the mold and the excess material in the mold is extruded through the space between the edges of the two lips. When the parts reach their final positions in the molding operation, the lips are so positioned that a narrow aperture or circumferential slit is left between them to allow the last of the excess material to escape.

According to the present invention, a wiper is provided consisting of a chunk or block of rubber 9 or other equivalent soft or yielding material, which is positioned to bear against the outer surface of the top-forming member and of the lip 8, and thus as it rotates with the plunger to wipe off the extruded material as it is squeezed out between them. This block of rubber is clamped tightly against the lip 7 by a jaw 10 of suitable shape, which is adjustably secured to the top-forming member by any suitable means, such as a screw 11. A hole 14 is provided in the jaw 10 to receive the screw 11 and is made slightly larger than the screw to permit the jaw 10 to tilt slightly with respect to the screw so as to bear properly against rubber blocks of different sizes and to be adjustable inwardly to compensate for wear on the block.

The screw may be set up so as to compress the chunk of rubber in the space defined by the lips 7 and 8, the shoulder 12 of the top-forming member, the upper surface 13 of the mold, and the jaw 10. This compression of the resilient or yieldable material in such a confined space insures a constant firm engagement of the wiper against the lips on the top-forming member and mold and spanning the aperture between them, and prevents any of the material from working in between the rubber and any of the surfaces against which it is pressed. Preferably, as shown, the rubber wiper extends below the jaw, so that it may be wedged outwardly or, in some cases, more or less compressed by the bevelled lip 8 as the plunger or die and top-forming member are reaching their final position.

The attachment of each block of rubber directly to the top-forming member by a single rigid piece and an ordinary machine screw provides a construction of the utmost simplicity. By loosening the screw, a fresh block of rubber may be inserted in a moment. By adjusting the screw, the rubber may be compressed to any desired degree, the reactive pressure of the rubber against the jaw serving to bind the screw in its adjusted position and lock it against working loose. Any other suitable locking means, however, may be added if desired. No special tools are required for this device, an ordinary screw driver being sufficient.

In the operation of the device, the leading free face of the rubber breaks or shears off the film of material which is being extruded, then the contacting face wipes the material at the aperture smooth, thus effectually preventing the formation of any fin or feather on the molded article.

From three to five wipers are preferably employed on each machine according to the size of the plunger, and are spaced about the circumference thereof, but of course any other number desired can be used.

Machines of the kind described are sometimes arranged so that the mold may be raised and lowered, and sometimes so that the rotating plunger may be raised and lowered, the other member in each case being at a fixed level. This invention applies equally well to either type of machine.

It is to be clearly understood that the invention is not to be limited by the preferred embodiment shown and described herein, but is subject to such modifications and changes as fall within the scope of the appended claims.

What I claim is:

1. A device of the class described, comprising a hollow mold member, a plunger member, one of said members being movable relatively to the other, a top-forming member movable with said plunger, and a wiper element actuable to remove the material extruded between the top-forming member and the mold, said wiper element comprising a block of soft material, and means for clamping said block against the top-forming member.

2. A device of the class described, comprising a pair of members cooperating to form a mold, one of said members being movable relatively to the other, means for removing excess material squeezed out from between said members, said means comprising a block of yieldable material, and means adjustable to clamp said block against one of said members.

3. A device of the class described, comprising a hollow mold, a rotatable plunger movable relatively to said mold, a top-forming member secured to said plunger, and means for removing the excess material squeezed out between the mold and top-forming member, said means comprising a plurality of blocks of soft material spaced about the periphery of said members, and jaws adjustable to clamp the blocks against the top-forming member.

4. In a machine of the class described, a mold, a top-forming member cooperating therewith, and a wiper attached directly to said member for removing extruded material and bearing against a lateral face of both the mold and the top-forming member when the two are in their nearest positions to each other, said wiper being arranged to remove by a wiping action excess material extruded from the mold.

5. In a machine of the class described, a top-forming member, a jaw element attached thereto, a block of soft rubber, and means for clamping the block between the jaw element and the top-forming member.

6. In a machine of the class described, a pair of shaping members having an aperture between them for the extrusion of excess material, and a wiper mounted directly on one of said members and bearing against a face of the other member when the members are in their nearest positions to each other, said wiper being arranged to remove by a wiping action excess material extruded through said aperture.

7. In a machine of the class described, a pair of shaping members having an aperture between them for the extrusion of excess material, one of said members being rotatable relatively to the other, and a wiper block rigidly clamped on the rotating member and spanning said aperture and arranged to remove by a wiping action excess material extruded through said aperture.

8. In a machine of the class described, a pair of shaping members, one being rotatable relatively to the other, a pair of lips on said members having an aperture between them for the extrusion of excess material, a block of resilient material, and means for holding the block rigidly against the other faces of the lips and spanning the aperture between them.

9. In a machine of the class described, a pair of shaping members, a jaw attached to one of said members, means for adjusting said jaw, and wiping means engaged by said jaw for removing excess material extruded from between said shaping members, said wiping means also serving to lock said adjusting means in position.

In testimony whereof I have affixed my signature.

CLIFFORD E. MANSIR.